United States Patent
Exnar

(10) Patent No.: US 6,841,295 B2
(45) Date of Patent: Jan. 11, 2005

(54) ROLLED ELECTRODE BATTERY WITH HEAT SINK

(75) Inventor: Ivan Exnar, Itingen (CH)

(73) Assignee: Renata AG (CH)

( * ) Notice: Subject to any disclaimer, the term of this patent is extended or adjusted under 35 U.S.C. 154(b) by 443 days.

(21) Appl. No.: 10/013,179

(22) Filed: Dec. 8, 2001

(65) Prior Publication Data

US 2002/0071986 A1 Jun. 13, 2002

(30) Foreign Application Priority Data

Dec. 8, 2000 (EP) .............................................. 00204389

(51) Int. Cl.[7] ........................ H01M 6/10; H01M 10/50; H01M 10/16; H01M 4/12
(52) U.S. Cl. ........................ 429/120; 429/94; 429/208; 429/210
(58) Field of Search .......................... 429/94, 120, 178, 429/181, 208, 211

(56) References Cited

U.S. PATENT DOCUMENTS 4,539,272 A * 9/1985 Goebel ........................ 429/94

FOREIGN PATENT DOCUMENTS

| EP | 0 620 610 A1 | 10/1994 |
| EP | 0 887 876 A1 | 6/1997 |
| EP | 0 936 691 A2 | 2/1998 |
| EP | 0 948 072 A1 | 3/1998 |
| EP | 0 955 682 A1 | 5/1998 |
| EP | 2000030975 | 7/1998 |
| EP | 1 011 156 A1 | 11/1998 |
| JP | 11144771 | 11/1997 |
| WO | WO 99/05748 | 7/1997 |

* cited by examiner

Primary Examiner—Patrick Ryan
Assistant Examiner—Thomas H. Parsons
(74) Attorney, Agent, or Firm—Richard K Robinson; Harry C Post; Robinson & Post, LLP

(57) ABSTRACT

The invention concerns a battery including a metallic container (1) delimiting a cavity (16) containing an electrolyte and a composite strip (2) formed by a first metallic sheet coated with a material forming the positive electrode, by a second metallic strip coated with a material forming the negative electrode and by porous insulating separators, composite strip (2) being wound onto a core (20) located at the centre of the cavity (16) and electrodes being connected by connecting means (8, 9) to external terminals (6, 7). It is characterized in that all or part of the central core (20) is made of a material with a high heat transmission coefficient in heat contact with at least the metallic closing cap (3).

4 Claims, 2 Drawing Sheets

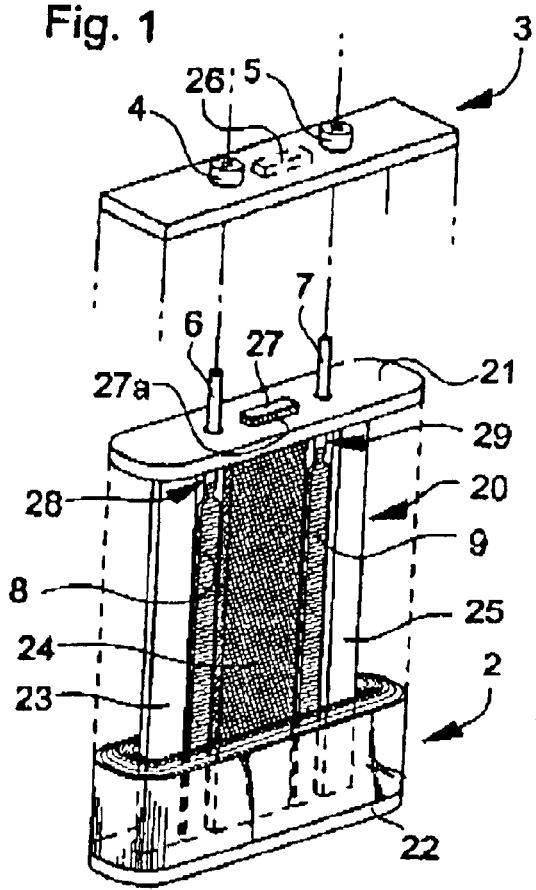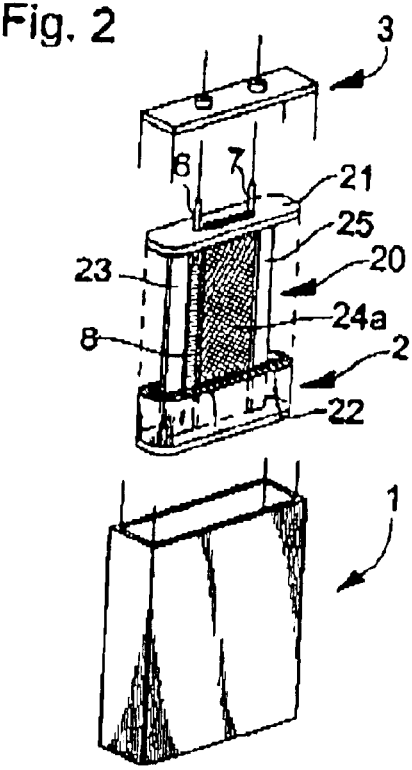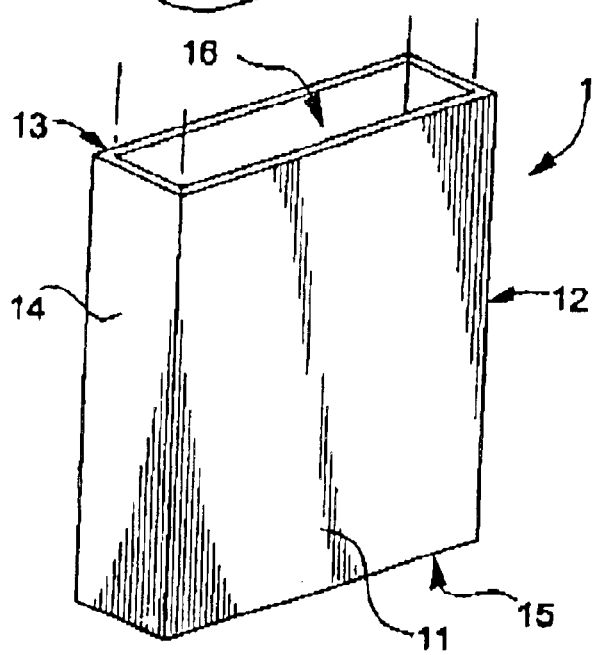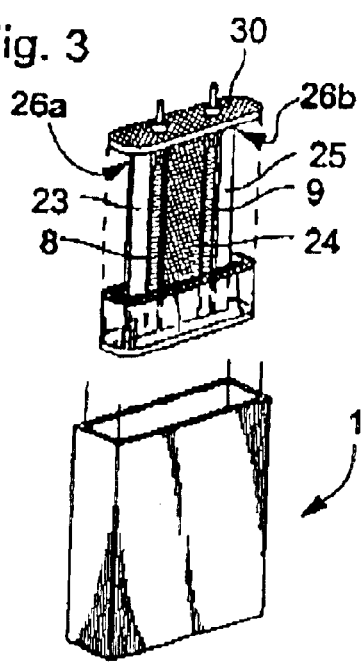

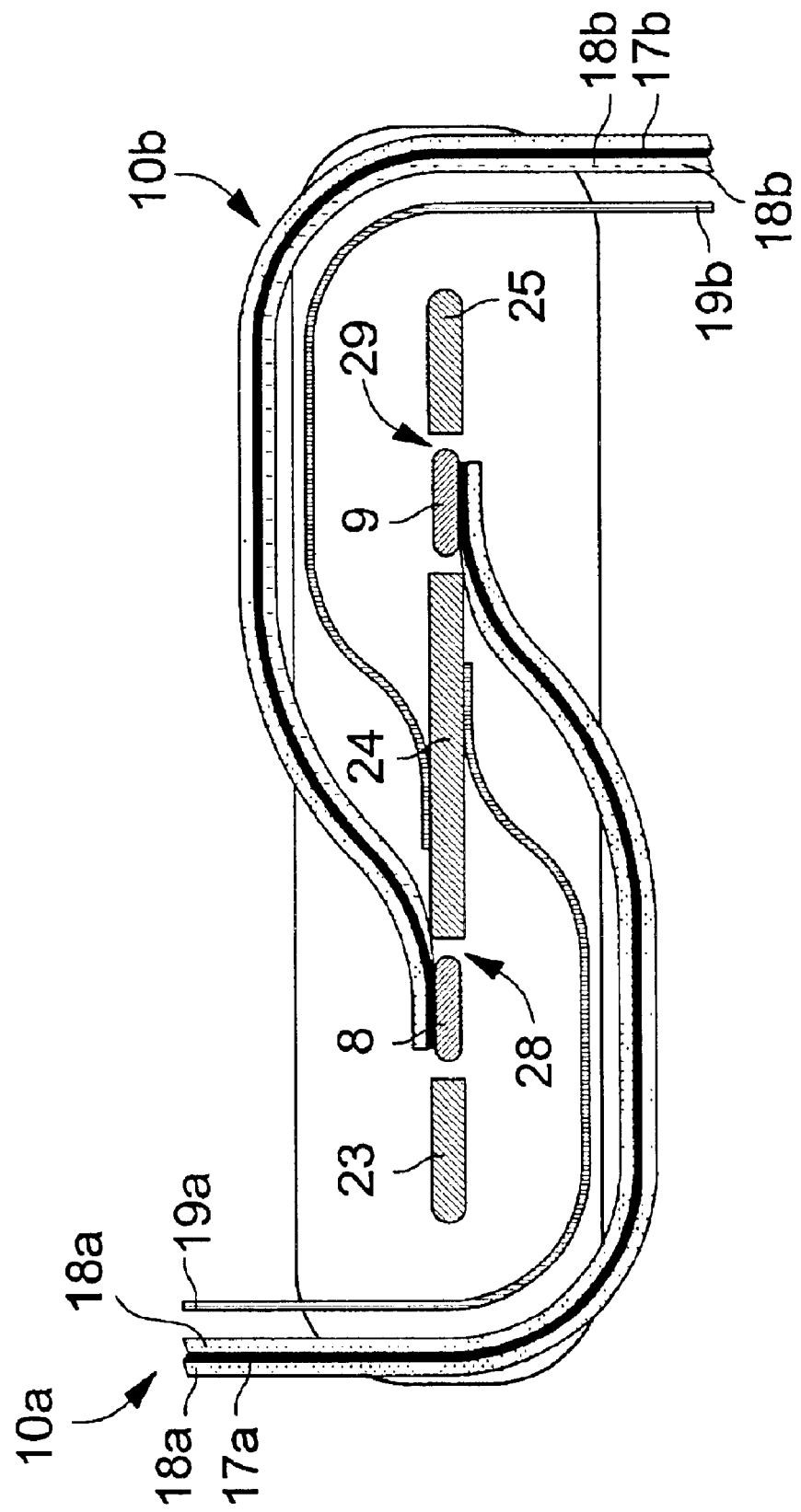

ROLLED ELECTRODE BATTERY WITH HEAT SINK

TECHNICAL FIELD

The present invention concerns an accumulator or battery with rolled electrodes of the "jelly roll" type, designated hereinafter by the generic term "battery", which is provided with an arrangement allowing the heat, which is released at the battery core when it is working in charging/discharging mode or when there is a malfunction, for example in the event of an accidental short-circuit, to be dissipated towards the exterior.

The invention concerns more particularly batteries of the Li-ion type, whether they are cylindrical or prismatic, whose utilisation safety window depends in particular upon the charge/utilisation voltage and upon a maximum temperature threshold.

DESCRIPTION OF THE PRIOR ART

In order to keep the voltage within the safety window, located approximately between 3 and 4.1 volts, a small electronic circuit is inserted between the positive and negative terminals allowing the battery to be switched off when the voltage is outside the safety window.

In certain conditions of use, a rapid exothermic reaction can occur, better known by the name of "thermal runaway". In order to keep the temperature below a critical threshold, located at approximately 160° C. for lithium-ion batteries, the heat exchanges between the interior and exterior of the battery must then be increased. J. R. Dahn & coll. [Solid State Ionics. 69,12. (1964)] has in fact demonstrated that beyond a critical temperature positive materials such as $Li_xCoO_2$, $Li_xNiO_2$ or $Li_xMn_2O_4$ become unstable and decompose releasing oxygen, the released quantity of which depends upon the value of x. For $Li_xNiO_2$ a value of x lower than 0.5 becomes critical. The thermal stability of the negative electrodes, formed for example of a graphite powder, available under the reference MCMB from Osaka Gas, with polyvinyl difluoride (PVDF) as a binding agent depends on size grading, surface and lithiation state. Between a temperature of approximately 120° and 140° C., the solid electrode interface (SEI) decomposes and $Li_xC$ (or non-intercalated metallic lithium) reacts with the binding agent and with the electrolyte. Schematically, the result of a thermal reaction in a Li-ion battery consists in the thermal decomposition of the electrolyte at the negative electrode, a thermal decomposition of the positive electrode with release of oxygen and in a reaction between the binding agent and the lithiated negative electrode. It is thus indispensable to provide means for dissipating the heat, to prevent the exothermic reactions at the battery core from leading to an explosion, or ignition.

Heat sink devices have already been proposed for batteries, not necessarily of the Li-ion type, most often for batteries whose electrodes are formed by a series of parallel plates, or by series of individual cells and for which an increase in volume due to a cooling device does not constitute a major drawback.

Numerous devices propose circulating a cooling fluid in gaps provided between or around the plates or cells. The U.S. Pat. No. 4,865,928 discloses a lead battery in which a cooling fluid is circulated in a U-shaped tube fixed to the negative electrode. In European Patent No. 0 586 778, the cooling fluid circulates between flasks made of plastic material hermetically heat welded respectively onto two opposite walls. European Patent No. 0 613 204 discloses an embodiment wherein a stack of cells leaves passages free for the flow of air. In U.S. Pat. No. 5,035,964, the flow of air around the battery is forced by causing convection movements in a casing by a thermal gradient due to the incident light. The cooling device disclosed in European Patent No. 0 403 569 for a lead battery consists in inserting heat conductive plates between the electrode plates, said heat conductive plates being connected on the outside to a heat sink device provided with wings.

None of the aforementioned devices can be adapted to a rolled electrode battery.

SUMMARY OF THE INVENTION

The object of the invention is thus to provide a cooling system from the core of a rolled electrode battery.

A battery according to the invention therefore includes a prismatic metallic container having a cavity delimited by two large walls, two small walls and a bottom containing an electrolyte and a composite strip formed by a first metallic sheet coated with an active material forming the positive electrode, by a second metallic strip coated with an active material forming the negative electrode and by one or more porous insulating separators, said composite strip being wound onto a core located at the center of the cavity, said core being formed by a rigid spool including a top plate and a bottom plate having substantially the dimensions of the bottom, said plates being connected by necks separated by openings and said electrodes being connected by connecting means to positive and negative external terminals passing through a metallic cap for closing the container. The battery is characterised in that at least one of said necks is made of a heat conductive material in contact with the metallic closing cap.

BRIEF DESCRIPTION OF THE DRAWINGS

Other features and advantages of the present invention will appear in the following description made with reference to the annexed drawings, in which:

FIG. 1 shows in blow up perspective of a first embodiment of the invention for a prismatic type battery;

FIGS. 2 and 3 are variants of the battery shown in FIG. 1; and

FIG. 4 shows a cross-section of an example winding of active materials for a battery shown in FIGS. 1 to 3.

DETAILED DESCRIPTION OF THE INVENTION

FIG. 1 shows in blown up perspective the three essential parts of a prismatic battery with a rolled winding, i.e. a metallic container 1, a spiral winding 2 around a spool 20, and a metallic closing cap 3. Metallic container 1 is formed of a tubular element including two large walls 11, 13, two small walls 12, 14 and a rectangular bottom 15 delimiting a cavity 16 intended to receive spiral winding 2 of active materials of the "jelly roll" type impregnated by an electrolyte, the assembly being then hermetically sealed by cap 3 on which are provided two contact zones 4, 5 which are electrically insulated from the cap and through which terminals 6, 7 pass. Spool 20 around which winding 2 is arranged, partially represented by its lower portion, is of the type described in European Patent No. 0 948 072 in the name of the Applicant and incorporated by reference in the present Application.

Spool 20 includes a top plate 21, a bottom plate 22 both having substantially the dimensions of the opening of container 1, these two plates being joined by two lateral narrow necks 23, 25. This part of the spool is made of an insulating plastic material, for example by injection moulding. Spool 20 includes in its central part a third neck 24 made of a material with a high heat transmission coefficient. Third neck 24, located at the core of spool 20 is much wider than lateral necks 23, 25 and is sufficiently spaced apart the lateral necks 23, 25 to arrange recesses 28, 29 intended to accommodate connecting means 8, 9 between the electrodes and terminals 4, 5, without being in electric contact with central neck 24. These connecting means are formed by a flattened metallic rod or tube, for example of aluminium for the anode and copper for the cathode. As can be seen in FIG. 1, central neck 24 has an extension 27 which passes through top plate 21 through an opening 27a made therein. Thus, after having set rolled winding 2 in place in container 1 and added the necessary quantity of electrolyte, when cap 3 is fitted, extension 27 comes into contact with the lower surface of cap 3 and thus establishes a thermal bridge not just with cap 3 but also with container 1 to which cap 3 is welded. In order to make the thermal bridge more efficient, it is possible to provide a housing 26 in the lower surface of cap 3, in which extension 27 of central neck 24 will engage. Metallic container 1 and cap 3 may be made in a known manner of steel which is a good heat conductor. They may also be made of aluminium, which is also a good heat conductor and whose lower mechanical resistance to pressure due to chemical reactions inside the battery may be compensated for by stamping large walls 11, 13, as is described in European Patent No. 0 948 064 in the name of the Applicant and incorporated by reference in the present Application.

The material forming central neck 24 may also be steel or aluminium or other good heat conducting metals such as copper, nickel or titanium.

In order to avoid corrosion of the central neck by the electrolyte, it is possible to coat it with a very thin plastic film or a very fine layer of insulating varnish, the influence of which on heat conduction will be negligible this coating also has the advantage of forming an electric security insulation between central neck 24 and the connecting means or strips of winding 2, described in more detail hereinafter with reference to FIG. 4.

In the embodiment shown, winding 2 on spool 20 is formed from two composite strips 10a and 10b of similar structure and positioned on either side of the spool so as to be able both to be wound in the same direction. A first strip 10a forming the anode includes a support 17a formed by a thin metallic strip made of copper (approximately 0.01 mm) both faces of which are coated with an active material 18a consisting for example in an amalgamated graphite powder and the other end of which is in electric contact, via welding or another method, with connecting means 9. Likewise, a second strip 10b includes a thin metallic strip made of aluminium 17b both faces of which are coated with an active material 18b consisting for example of an amalgam of $LiCoO_2$. These two strips 10a, 10b each further include a strip-shaped porous separator 19a, 19b bonded respectively on either side of necks 23, 24 and 25 so as to be inserted between central neck 24 and composite strips 10a, 10b. These separators may for example be bonded onto the opposite faces of central neck 24 as shown in FIG. 5, or onto the faces of lateral necks 23, 25 after having been engaged in recesses 28, 29, it is clear that other types of windings and other active materials may be used without departing from the scope of the invention.

With reference now to FIG. 2, a variant of the embodiment which has just been described can be seen. In many batteries, it is very common for the metallic container to form one of the positive or negative poles of the battery. In such case, it is possible to further increase the heat exchange surface inside the battery by merging central neck 24 and connecting means, for example connecting means 9 as shown in FIG. 2, in a single element 24a. The supporting metallic sheet 17a or 17b of the electrode welded to this widened central neck 24a also allows the heat generated inside the battery to be drained through said central neck 24a to be dissipated by the outer envelope formed by container 1 and cap 3.

FIG. 3 shows a second alternative embodiment wherein cap 3 and top plate 21 are merged in a single closing element 30 for container 1, this closing element obviously being metallic. In order to assure the positioning of lateral necks 23, 25 made of non heat or electric conductive material, locking recesses 26a, 26b are provided in the lower face of closing element 30.

According to another variant which is not shown, it is possible to combine the two preceding variants having both central neck 24 merged with connecting means 8 or 9, and cap 3 merged with upper plate 21.

The embodiments which have just been described are capable of being adapted by those skilled in the art, for example to take account of the specific shape of a battery, without departing from the scope of the present invention.

What is claimed is:

1. A battery including a prismatic metallic container having a cavity delimited by two large walls, two small walls and a bottom containing an electrolyte and a composite strip formed by a first metallic sheet coated with an active material forming the positive electrode, by a second metallic strip coated with an active material forming the negative electrode and by one or more porous insulating separators, said composite strip being wound onto a core located at the center of the cavity, said core being formed by a rigid spool including a top plate and a bottom plate having substantially the dimensions of the bottom, said plates being joined by necks separated by openings and said electrodes being connected by connecting means to positive and negative external terminals passing through a metallic cap for closing the container, wherein the spool includes two lateral narrow necks made of an insulating material and a central neck made of a heat conductive material, the openings between the necks being occupied by the connecting means.

2. A battery according to claim 1, wherein one of the connecting means is merged with the central neck.

3. A battery according to claim 1, wherein the metallic cap is merged with the top plate of the spool.

4. A battery according to claim 1, wherein the heat conductive material with a high heat transmission coefficient is selected from among copper, aluminum, nickel, titanium and steel.

* * * * *